United States Patent

Mindock, III

(10) Patent No.: US 9,180,514 B2
(45) Date of Patent: Nov. 10, 2015

(54) DEPOSITED CORE CAST DIAFRAM PROCESS

(75) Inventor: Michael Arthen Mindock, III, New Ringgold, PA (US)

(73) Assignee: Elliott Company, Jeannette, PA (US)

( * ) Notice: Subject to any disclaimer, the term of this patent is extended or adjusted under 35 U.S.C. 154(b) by 0 days.

(21) Appl. No.: 14/004,243

(22) PCT Filed: Aug. 13, 2012

(86) PCT No.: PCT/US2012/050505
§ 371 (c)(1),
(2), (4) Date: Sep. 10, 2013

(87) PCT Pub. No.: WO2013/062657
PCT Pub. Date: May 2, 2013

(65) Prior Publication Data
US 2014/0000831 A1  Jan. 2, 2014

Related U.S. Application Data

(60) Provisional application No. 61/529,555, filed on Aug. 31, 2011.

(51) Int. Cl.
*B22C 9/10*   (2006.01)
*B22D 19/04*  (2006.01)
*B22D 19/00*  (2006.01)

(52) U.S. Cl.
CPC . *B22D 19/04* (2013.01); *B22C 9/10* (2013.01); *B22D 19/00* (2013.01)

(58) Field of Classification Search
CPC .................................. B22C 9/10; B22D 19/04
USPC ........................ 164/6, 15, 28, 137, 369, 370
See application file for complete search history.

(56) References Cited

U.S. PATENT DOCUMENTS

| | | |
|---|---|---|
| 4,294,303 A | 10/1981 | Flesburg |
| 4,674,552 A | 6/1987 | Howe |
| 4,955,423 A | 9/1990 | Blazek |
| 5,204,055 A | 4/1993 | Sachs et al. |
| 6,146,567 A | 11/2000 | Sachs et al. |
| 6,860,315 B2 * | 3/2005 | Williamson ............. 164/133 |
| 6,986,644 B2 | 1/2006 | Shaw |
| 2004/0219021 A1 | 11/2004 | Shaw |

* cited by examiner

*Primary Examiner* — Kevin P Kerns
(74) *Attorney, Agent, or Firm* — The Webb Law firm

(57) ABSTRACT

A method for casting a diafram having inner and outer rings with preformed vanes circumferentially spaced therebetween is disclosed. A digital representation of a sand core is created. Based on this digital representation, a sand core is produced by bonding together successive layers of sand with droplets of a binder material using a binder printhead having nozzles for supplying jets of binder material droplets. A plurality of vanes is inserted into the cavities of the sand core. The sand core is then placed into a casting mold and filled with liquid metal. After the liquid metal has solidified and cooled, the sand core and any remaining sand is removed from the cast diafram.

5 Claims, 3 Drawing Sheets

DEPOSITED CORE CAST DIAFRAM PROCESS

BACKGROUND OF THE INVENTION

1. Field of the Invention

This invention relates generally to the casting of a diafram (aka. diaphragm) for use in steam turbines, gas turbines, and expanders.

2. Description of Related Art

A diafram is a critical part in the flow path of steam turbines, gas turbines, and expanders. A diafram is a structure comprising an inner ring (smaller diameter) and an outer ring (larger diameter) that supports radial, or nearly radial, vanes captured at their inner and outer radial ends and substantially uniformly circumferentially spaced. Axial flow directed through the vane passages (area between the endwall of the rings and the vanes) converts thermal energy to kinetic energy that imparts angular momentum to the turbine rotor to create mechanical power. The turbine transfers fluid thermal energy to the driven equipment with which it is associated. These diaframs are typically manufactured by welding airfoil-shaped preformed vanes into inner and outer rings, or by casting preformed vanes into inner and outer rings. However, this casting process relies on complex patterns and core construction tools to properly position the vanes within the diafram, and these patterns and core building tools are not precise and wear over time. As a result, the location and orientation of the vanes in the cast diafram core are not precisely controlled. Any deviation in the location and/or orientation of the vane causes a deviation in the vane throat area, which substantially controls the fluid flowrate and affects the quality of energy transfer. Therefore, precise control of the vane position and orientation is critical in order to meet performance requirements for flowrate and power.

The technology allowing more precise positioning of the diafram vanes in the casting core is termed "three-dimensional printing." It is already part of rapid casting technology and is disclosed in U.S. Pat. Nos. 5,204,055 and 6,146,567. As described in these patents, a three-dimensional component can be created by bonding together successive layers of a porous material with droplets of a binder material. A multiple array of on-off controlled nozzles is scanned over the surface of a bed of porous material in multiple passes using an interlacing of the printed lines which deposit the binder thereon. This method enables the creation of three-dimensional sand cores built in a layer-wise fashion.

SUMMARY OF THE INVENTION

Currently, manufacturers of cast diaframs use very old diafram core building techniques that does not facilitate precise vane positioning and good diafram endwall surface finish. This invention improves the precision of the diafram vane orientation and throat area, reduces casting production time, and improves the endwall surface quality. This new invention allows any vane profile shape to be employed along with any endwall profile shape from the traditional cylindrical shape to curve endwalls for reducing secondary losses in the vane passage. As a result of the improved diafram throat area and vane orientation, prediction of turbine or expander performance is more precise.

A method for casting a diafram having inner and outer rings with preformed vanes circumferentially spaced therebetween is disclosed. A digital representation (three-dimensional model) of a sand core is created. The sand core displaces the volume that will comprise the vane passage and critical throat area after casting. Based on this digital representation, the sand core is produced by bonding together successive layers of sand with droplets of a binder material using a binder printhead having nozzles for supplying jets of binder material droplets. A plurality of vanes is inserted into cavities of the sand core, and a high-temperature putty is applied between the vane at the core endwall surfaces to prevent molten metal from leaking into the flowpath. The sand core is then placed into a casting mold defining at least the outer circumference of the outer ring and the casting mold is filled with liquid metal. After the liquid metal has solidified and cooled, the sand core is removed from the casting.

BRIEF DESCRIPTION OF THE DRAWINGS

The invention can be described in more detail with the help of the accompanying drawings wherein.

DESCRIPTION OF THE PREFERRED EMBODIMENTS

Figure 1:
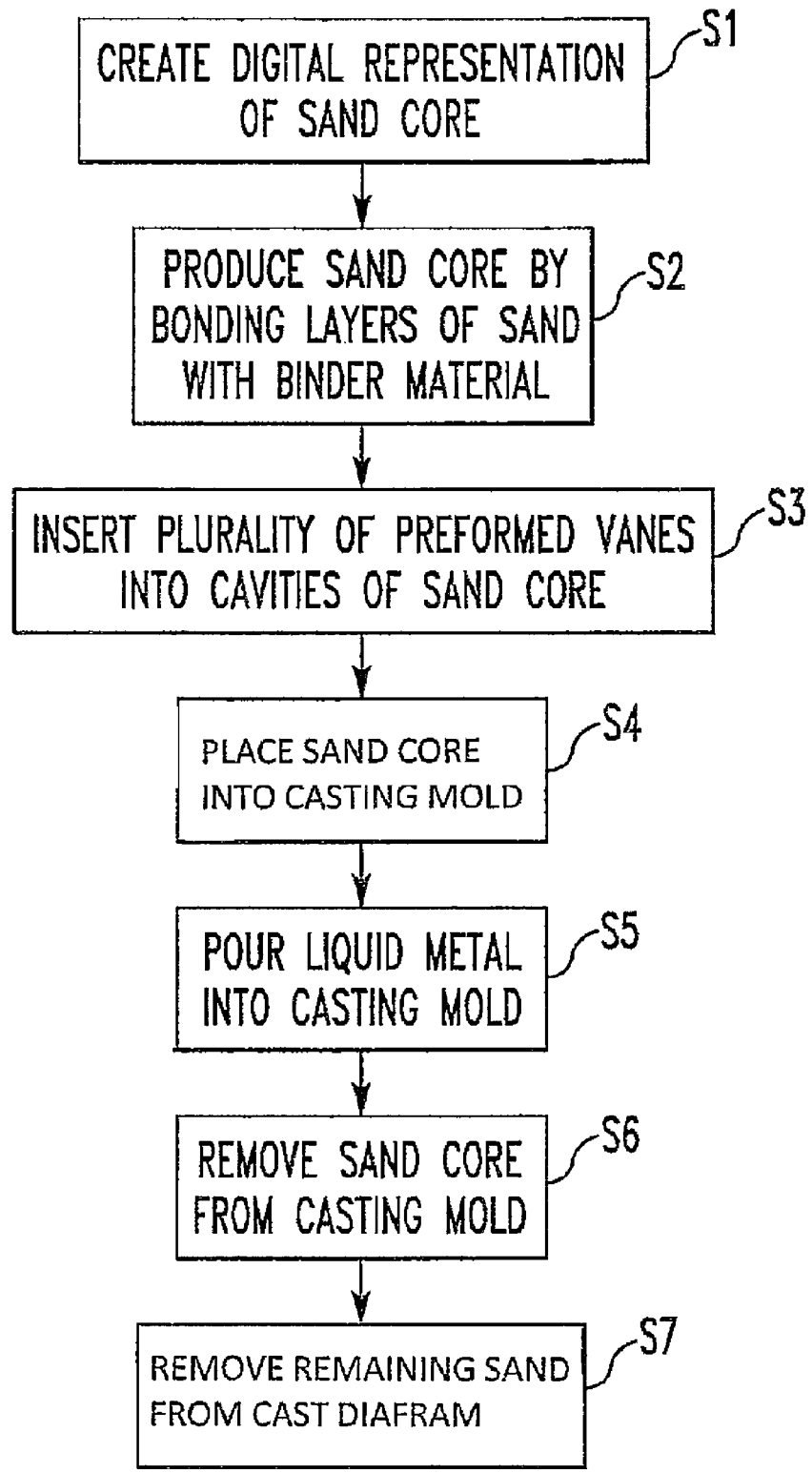
FIG. 1 is a flow sheet illustrating one embodiment of the method of the invention.
Figure 2:
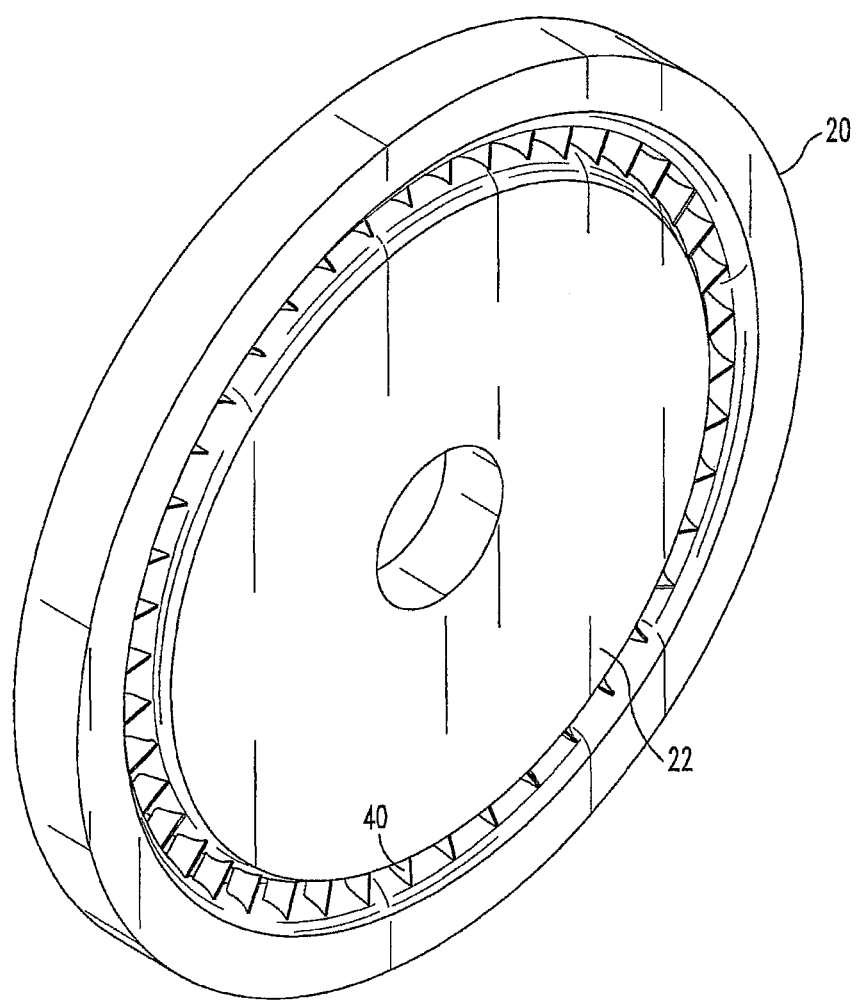
FIG. 2 is a perspective view of the cast diafram.

The present invention is a method for casting a diafram, one embodiment of which is illustrated in FIG. 1. The cast diafram, as shown in FIG. 2, comprises an inner ring 22 and an outer ring 20 with preformed vanes 40 circumferentially spaced therebetween.

Figure 3:
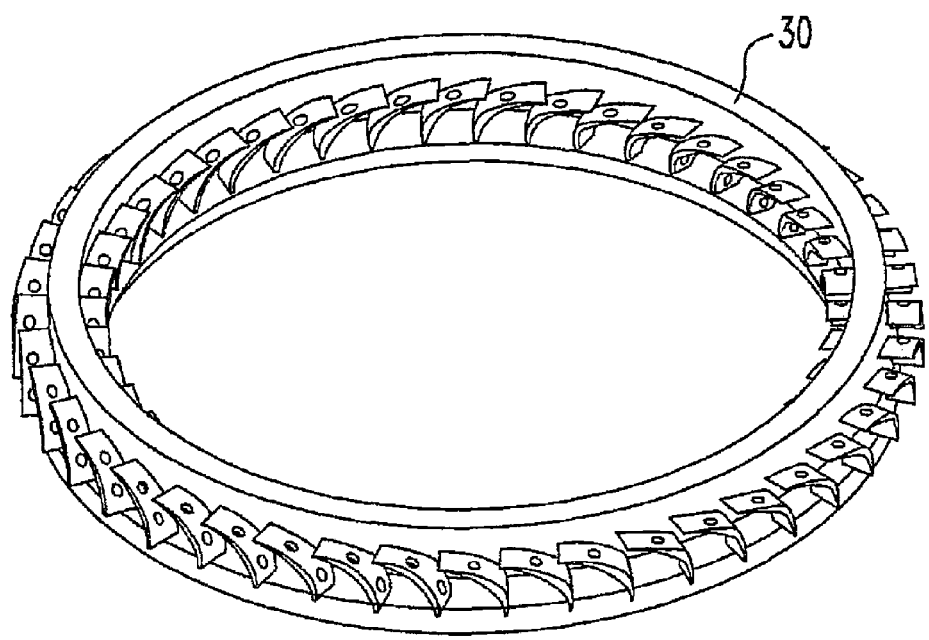
FIG. 3 is a perspective view of the completed sand core with inserted vanes.

The method comprises creating a digital representation (digital three-dimensional model) of a sand core (Step S1, FIG. 1). The digital representation or three-dimensional model of the core can be constructed with well known computer-aided design computer programs. The outer circumference of the core defines the inner circumference of the outer ring and the inner circumference of the core defines the outer circumference of the inner ring. Based on the digital representation of the sand core, a sand core 30 is produced by bonding together successive layers of sand with droplets of a binder material using a binder printhead having nozzles for supplying jets of binder material droplets (Step S2). A slicing algorithm may be used to identify selected slices of the three-dimensional model for controlling the dispensing of the sand/binder droplets on a given pass of the print heads. The sand core 30, according to FIG. 3, defines a space between the inner ring 22 and the outer ring 20 and has circumferentially spaced cavities 42 therein for receipt of the preformed vanes 40. After creation of the sand core 30, a plurality of preformed vanes 40 are manually inserted into the radially spaced cavities 42 of the sand core 30 (Step S3, FIG. 1), and a high-temperature putty is manually applied around the vane profile on the inside and outside surfaces of the core. The sand core 30 is deposited in a casting mold (Step S4). The casting mold defines a cylindrical space having a cylindrical wall that defines the outer circumference of the outer ring of the diafram and the inner circumference of the inner ring. The axis of the sand core is aligned with the axis of the casting mold. Thus, the ends of preformed vanes abutting the cylindrical walls of the casting mold precisely establish the radial position of the vanes. Liquid metal is poured into the casting mold (Step S5). After the liquid metal has solidified and cooled, the sand core 30 is removed from the casting mold (Step S6) and the remaining excess sand is removed from the cast diafram (Step S7).

According to a preferred embodiment, it is useful that the radial edges of the cavities 42 be slightly chamfered and after insertion of a vane in the cavity the space provided by the chamfer be filled with a high temperature paste to seal the cavity and in order to prevent a small flashing that metal leaked into the cavity would provide.

Figure 4:
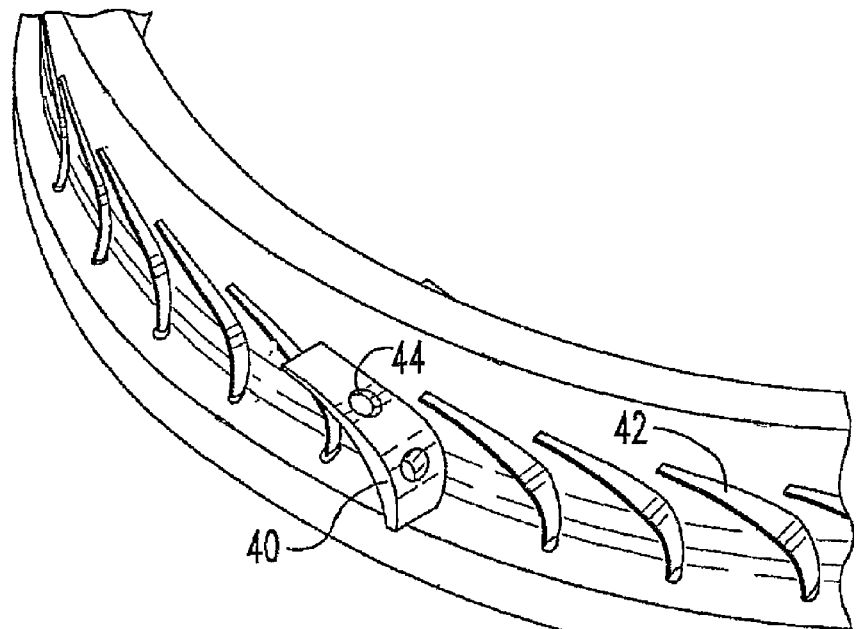
FIG. 4 is a partial perspective view of the placement of the inserted vanes prior to casting.

Preferably, the plurality of preformed vanes 40 has curved radial surfaces which are uniformly spaced apart from radial end to radial end. Preferably, the plurality of preformed vanes 40 has through-holes 44, as shown in FIG. 4. These through-holes 44 are positioned near each radial edge of the vane and are filled during casting. The use of the through-holes 44 enables the preformed vanes 40 to positively secure to the inner ring 22 and the outer ring 20.

Preferably, the cavities 42 of the sand core 30 are sized to accept a tight-fit of the plurality of preformed vanes 40. This ensures that the preformed vanes do not move once inserted into the casting mold and allows for higher precision when casting the diafram. Preferably, the cylindrical axis of the sand core 30 is positioned in-line with the cylindrical axis of the casting mold.

The invention claimed is:

1. A method for casting a diafram comprising inner and outer rings with preformed vanes radially captured and uniformly circumferentially spaced therebetween comprising the steps of:
   creating a digital representation of an annular sand core defining the vane passage and throat space between the inner and outer rings of the diafram and having radial cavities substantially uniformly circumferentially spaced therein for receipt of preformed vanes and wherein said cavities of the sand core are sized to accept a tight-fit of said plurality of preformed vanes;
   based on said digital representation of a sand core, producing the sand core by bonding together successive layers of sand with droplets of a binder material using a binder printhead having nozzles for supplying jets of binder material droplets, wherein the sand core displaces a volume corresponding to the passage between the vanes and the throat space after casting the diafram;
   inserting a plurality of preformed vanes into said cavities of the sand core;
   depositing the sand core into a casting mold defining one face and the outer circumference of the outer ring and one face and the inner circumference of the inner ring with the axes of the sand core and the casting mold aligned;
   pouring liquid metal into the casting mold;
   removing the sand core from the casting mold after liquid metal has cooled and solidified to recover a cast diafram; and
   removing the remaining sand from the cast diafram.

2. The method according to claim 1, wherein said plurality of preformed vanes has through-holes positioned near each radial end of the vane which are filled during casting thus positively securing the vanes to the inner and outer rings.

3. The method according to claim 1, wherein said plurality of preformed vanes has a curved shape.

4. The method according to claim 1, wherein said plurality of preformed vanes have curved surfaces which are uniformly spaced apart radial end to radial end.

5. The method according to claim 1, wherein the cylindrical axis of the sand core is positioned in-line with the cylindrical axis of the casting mold.

\* \* \* \* \*